(12) United States Patent
Nowak et al.

(10) Patent No.: US 10,079,937 B2
(45) Date of Patent: Sep. 18, 2018

(54) SYSTEM AND METHOD FOR PROVIDING AGENT ASSISTANCE IN CONTACT CENTERS

(71) Applicant: Avaya Inc., Santa Clara, CA (US)

(72) Inventors: Dawid Nowak, Dublin (IE); Tony McCormack, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 274 days.

(21) Appl. No.: 14/287,378

(22) Filed: May 27, 2014

(65) Prior Publication Data
US 2015/0350430 A1    Dec. 3, 2015

(51) Int. Cl.
*H04M 3/51* (2006.01)

(52) U.S. Cl.
CPC .................. *H04M 3/5175* (2013.01)

(58) Field of Classification Search
CPC ........... H04M 3/5175; H04M 3/42221; H04M 2203/401; H04M 2203/402; H04M 2201/42
USPC ....................... 379/265.06, 265.09
See application file for complete search history.

(56) References Cited

U.S. PATENT DOCUMENTS

| 2002/0080950 A1* | 6/2002 | Koko et al. ............. 379/265.06 |
| 2008/0107255 A1* | 5/2008 | Geva et al. ............. 379/265.06 |
| 2011/0206198 A1* | 8/2011 | Freedman et al. ....... 379/265.03 |
| 2014/0244285 A1* | 8/2014 | Hinkle ................... G06Q 50/22 |
| | | 705/2 |

* cited by examiner

*Primary Examiner* — Ahmad F Matar
*Assistant Examiner* — Jirapon Intavong (57) ABSTRACT

A call manager for providing agent assistance in a contact center is disclosed. The call manager includes a monitoring module configured to monitor at least one conversation between a customer and an agent and to monitor one or more attributes of the agent. The call manager further includes a selection module configured to select one or more data items based on the at least one monitored conversation and the one or more monitored attributes of the agent. The call manager further includes a display module configured to display the one or more selected data items to the agent.

17 Claims, 4 Drawing Sheets

SYSTEM AND METHOD FOR PROVIDING AGENT ASSISTANCE IN CONTACT CENTERS

BACKGROUND

Field of the Invention

Embodiments of the present invention generally relate to a system and method for providing agent assistance and particularly to a system and method for providing agent assistance to improve handling of incoming calls.

Description of Related Art

Contact centers are employed by many enterprises to service inbound and outbound contacts from customers. A typical contact center includes a switch and/or server to receive and route incoming packet-switched and/or circuit-switched contacts and one or more resources, such as human agents and automated resources (e.g., Interactive Voice Response units (IVR)), to service the incoming contacts. Contact centers distribute contacts, whether inbound or outbound, for servicing to any suitable resource according to predefined criteria. In many existing systems, the criteria for servicing the contact from the moment the contact center becomes aware of the contact until the contact is connected to an agent are client or operator-specifiable (i.e., programmable by the operator of the contact center), via a capability called vectoring. Normally in present-day Automatic Call Distributions (ACDs) when the ACD system detects an agent has become available to handle a contact, the ACD system identifies all predefined contact-handling queues for the agent (usually in some order of priority) and delivers to the agent with the highest-priority, oldest contact that matches the agent's highest-priority queue. Generally, the only condition that results in a contact not being delivered to an available agent is that there are no contacts waiting to be handled.

The primary objective of contact center management is to ultimately maximize contact center performance and profitability. An ongoing challenge in contact center administration is monitoring and optimizing contact center efficiency. The contact center efficiency is generally measured in two ways—service level and match rate.

Service level is one measurement of the contact center efficiency. Service level is typically determined by dividing the number of contacts accepted within the specified period by the number accepted plus the number that were not accepted, but completed in some other way (e.g., abandoned, given busy, canceled, flowed out). Of course, service level definitions may vary from one enterprise to another.

Match rate is another indicator used in measuring contact center efficiency. Match rate is usually determined by dividing the number of contacts accepted by a primary skill level agent within a period of time by the number of contacts accepted by any agent for a queue over the same period. An agent with a primary skill level is one that typically can handle contacts of a certain nature most effectively and/or efficiently. There are other contact center agents that may not be as proficient as the primary skill level agent, and those agents are identified either as secondary skill level agents or backup skill level agents. As can be appreciated, contacts received by a primary skill level agent are typically handled more quickly and accurately or effectively (e.g., higher revenue attained) than a contact received by a secondary or even backup skill level agent. Thus, it is an objective of most contact centers to optimize match rate along with the service level.

In addition to service level and match rate performance measures, contact centers use other Key Performance Indicators ("KPIs"), such as revenue, estimated, actual, or predicted wait time, average speed of answer, throughput, agent utilization, agent performance, agent responsiveness and the like, to calculate performance relative to their Service Level Agreements ("SLAs"). Operational efficiency is achieved when KPIs are managed near, but not above, SLA levels.

Throughput is a measure of the number of calls/contact requests or work requests that can be processed in a given amount of time. Agent utilization is a measure of how efficiently agents' time is being used. Customer service level is a measure of the time customers spend waiting for their work to be handled. Company contact centers wish to provide service to as many customer requests as possible in a given amount of time, using the least number of agents to do so, and minimizing the wait time for their customers that can increase the service level agreement of the contact center.

Generally, to achieve these desired business goals, a predefined script is provided to the agents of the contact center to handle the calls and to provide better services to the customers. For example, a predefined script may have instructions to say "hello" within first 30 seconds of the call and to say "goodbye" before completion of the call. Further, when calls having different call patterns (e.g., calls related to "car loan", "home loan" etc.) are routed to agents, then the agents concentrate on the call and follow all the instructions of the predefined scripts while providing services to the customers. For example, an agent, who is proficient in providing services about a home loan policy, receives a call from a customer to inquire about a healthcare policy, and then the agent may follow a predefined script associated with the healthcare policy with full attention and concentration to provide service to the customer.

On the other hand, when calls having similar patterns (e.g., all calls related to "car loan policy") are routed to an agent who may have handled similar calls in the past, then the agent, generally, does not refer the predefined scripts and quickly provides services to the customers as the agent is already familiar with the call pattern. However, with the repetitive work and similar call patterns, the agents may not concentrate on the call and may take quick and sub-optimal decisions that may further lead to errors. Further, the familiarity with the routine call pattern of the calls lowers the agent's attention span and concentration level which may further reduce the desired values of the business goals of the contact center.

There is thus a need for a system and method for providing agent assistance to improve handling of the calls and further forces the agent to re-analyze the customer's query before providing the customer services.

SUMMARY

Embodiments in accordance with the present invention provide a call manager for providing agent assistance in a contact center. The call manager includes a monitoring module configured to monitor at least one conversation between a customer and an agent and to monitor one or more attributes of the agent. The call manager further includes a selection module configured to select one or more data items based on the at least one monitored conversation and the one or more monitored attributes of the agent. The call manager further includes a display module configured to display the one or more selected data items to the agent.

Embodiments in accordance with the present invention further provide a computer-implemented method for providing agent assistance in a contact center. The computer-implemented method includes monitoring at least one conversation between a customer and an agent and monitoring one or more attributes of the agent, extracting one or more keywords from the at least one monitored conversation, selecting one or more data items based on the one or more extracted keywords and the one or more monitored attributes of the agent, and displaying the one or more selected data items to the agent.

Embodiments in accordance with the present invention further provide a computer-implemented method for providing agent assistance in a contact center. The method includes monitoring at least one conversation between a customer and an agent and monitoring one or more attributes of the agent, extracting one or more keywords from the at least one monitored conversation, determining one or more data items for the agent based on the one or more monitored attributes of the agent and the one or more extracted keywords, selecting the one or more determined data items, and displaying the one or more selected data items to the agent to improve handling of the at least one conversation.

The present invention can provide a number of advantages depending on its particular configuration. First, the present invention provides a system and a method for providing agent assistance in a contact center to improve handling of calls. The present invention selects a data item, which is presented to the agent to disrupt his or her (collectively "his") regular thinking pattern and to force him to focus on the call while providing services to the customers. Further, the present invention enables the agent to re-analyze or re-think the conversation with the customer to provide better services.

Next, the present invention displays the data items on the agent's desktop to draw his attention towards a particular keyword during the conversation with the customer. Further, the present invention displays a random data item on the agent's desktop to determine whether the agent is focusing on the call. The present invention enables the agent to concentrate on the call that may result in less error and that may further result in achieving the desired business goals of the contact center.

These and other advantages will be apparent from the disclosure of the present invention(s) contained herein.

The preceding is a simplified summary of embodiments of the present invention to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings, and wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

The present invention will be illustrated below in conjunction with an exemplary communication system, e.g., the Avaya Aura® system. Although well suited for use with, e.g., a system having an Automatic Call Distribution (ACD) or other similar contact processing switch, the present invention is not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood the database may be any type of database, such as relational, hierarchical, object-oriented, and/or the like. Accordingly, the present invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a private Branch Exchange (PBX), an ACD, an enterprise switch, or other type of communications system switch or server, as well as other types of processor-based communication control devices such as media servers, computers, adjuncts, etc.

Figure 1:
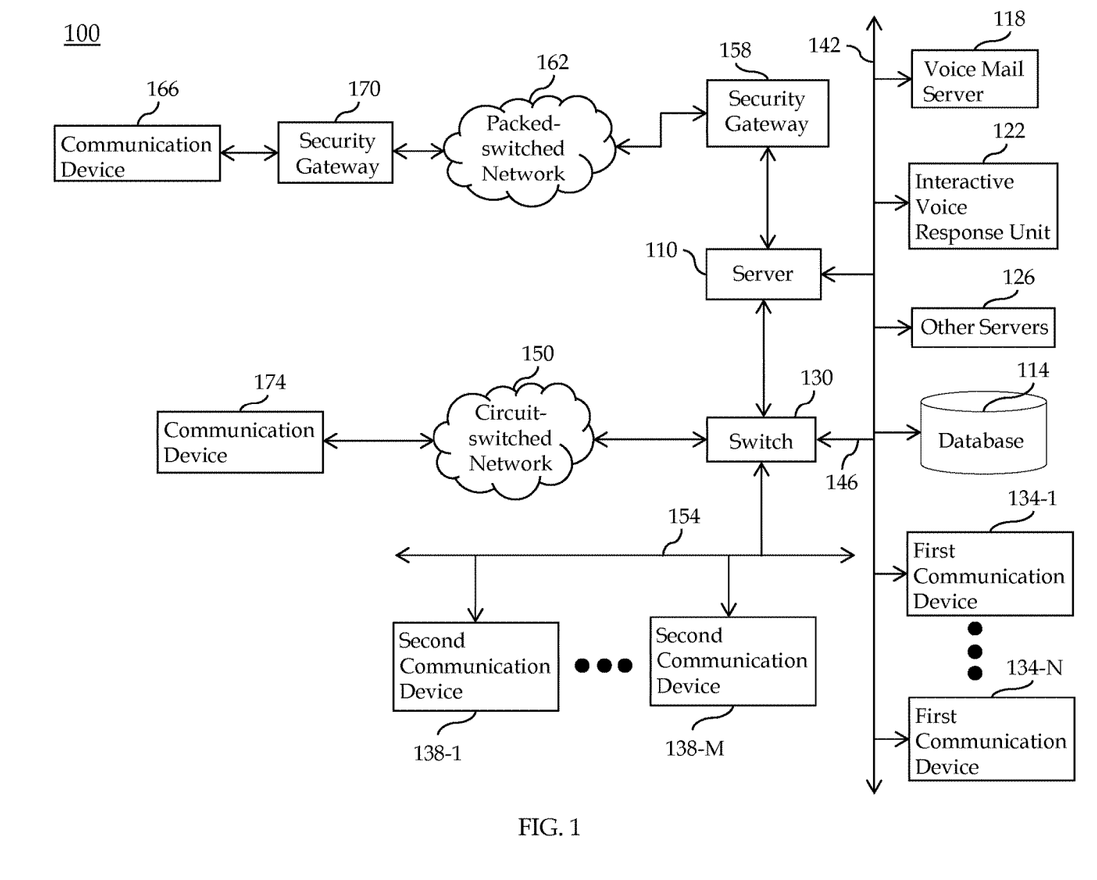
FIG. 1 illustrates a block diagram depicting a contact center according to an embodiment of the present invention.

FIG. 1 shows an illustrative embodiment of the present invention. A contact center 100 comprises a server 110, a set of data stores or databases 114 containing contact (or call) or customer related information, data items, and other information that may enhance the value and efficiency of the contact processing, and a plurality of servers, namely a voice mail server 118, an Interactive Voice Response unit (e.g., IVR) 122, and other servers 126, a switch 130, a plurality of working agents operating packet-switched (first) communication devices 134-1-N (such as computer work stations or personal computers), and/or circuit-switched (second) communication devices 138-1-M, all interconnected by a Local Area Network (LAN) 142, (or Wide Area Network (WAN)). The servers may be connected via optional communication lines 146 to the switch 130. As will be appreciated, the other servers 126 may also include a scanner (which is normally not connected to the switch 130 or Web Server), VoIP software, video call software, voice messaging software, an IP voice server, a fax server, a web server, an email server, and the like. The switch 130 is connected via a plurality of trunks to a circuit-switched network 150 (e.g., Public Switch Telephone Network (PSTN)) and via link(s) 154 to the second communication devices 138-1-M. A security gateway 158 is positioned between the server 110 and a packet-switched network 162 to process communications passing between the server 110 and the packet-switched network 162. In an embodiment of the present invention, the security gateway 158 (as shown in FIG. 1) can be Avaya Inc.'s, G700 Media Gateway™ and may be implemented as hardware such as via an adjunct processor (as shown) or as a chip in the server.

The switch 130 and/or server 110 may be any architecture for directing contacts to one or more communication devices. In some embodiments of the present invention, the switch 130 may perform load-balancing functions by allocating incoming or outgoing contacts among a plurality of logically and/or geographically distinct contact centers. Illustratively, the switch 130 and/or server 110 may be a modified form of the subscriber-premises equipment sold by Avaya Inc. under the names Definity™ Private-Branch Exchange (PBX) based ACD system, MultiVantage™ PBX, Communication Manager™, S8300™ media server and any other media servers, SIP Enabled Services™, Intelligent Presence Server™, and/or Avaya Interaction Center™, and any other products or solutions offered by Avaya or another company. Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide ACD functionality. Other types of known switches and servers are well known in the art and therefore not described in detail herein.

The first communication devices 134-1-N are packet-switched and may include, for example, IP hardphones such as the Avaya Inc.'s, 4600 Series IP Phones™, IP softphones such as Avaya Inc.'s, IP Softphone™, Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched devices. Each of the second communication devices 138-1-M corresponds to one of a set of internal extensions Ext1-M, respectively. The second communication devices 138-1-M may include, for example, wired and wireless telephones, PDAs, H.320 videophones and conferencing units, voice messaging and response units, traditional computer telephony adjuncts, and any other communication device.

It should be noted the present invention does not require any particular type of information transport medium between switch, or server and first and second communication devices, i.e., the present invention may be implemented with any desired type of transport medium as well as combinations of different types of transport channels.

The packet-switched network 162 can be any data and/or distributed processing network, such as the Internet. The packet-switched network 162 typically includes proxies (not shown), registrars (not shown), and routers (not shown) for managing packet flows.

The packet-switched network 162 as shown in FIG. 1 is in communication with a first communication device 166 via a security gateway 170, and the circuit-switched network 150 with an external second communication device 174.

In a preferred configuration, the server 110, the packet-switched network 162, and the first communication devices 134-1-N are Session Initiation Protocol (SIP) compatible and can include interfaces for various other protocols such as the Lightweight Directory Access Protocol (LDAP), H.248, H.323, Simple Mail Transfer Protocol (SMTP), IMAP4, ISDN, E1/T1, and analog line or trunk.

It should be emphasized the configuration of the switch 130, the server 110, user communication devices, and other elements as shown in FIG. 1 is for purposes of illustration only and should not be construed as limiting the invention to any particular arrangement of elements.

Further, the server 110 is notified via the LAN 142 of an incoming work item by the communications component (e.g., switch 130, fax server, email server, web server, and/or other server) receiving the incoming work item as shown in FIG. 1. The incoming work item is held by the receiving telecommunications component until the server 110 forwards instructions to the component to forward or route the contact to a specific contact center resource, such as the IVR unit 122, the voice mail server 118, and/or first or second telecommunication device 134-1-N, 138-1-M associated with a selected agent.

Although the preferred embodiment is discussed with reference to client-server architecture, it is to be understood the principles of the present invention apply to other network architectures as well. For example, the present invention applies to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user.

By contrast in the peer-to-peer model or paradigm, each networked host runs both the client and server parts of an application program. Additionally, the present invention does not require the presence of packet- or circuit-switched networks. The term "switch" or "server" as used herein should be understood to include a Private Branch Exchange (PBX), an ACD, an enterprise switch, an enterprise server, or other type of telecommunications system switch or server, as well as other types of processor-based communication control devices such as media servers, computers, adjuncts, etc.

Figure 2:
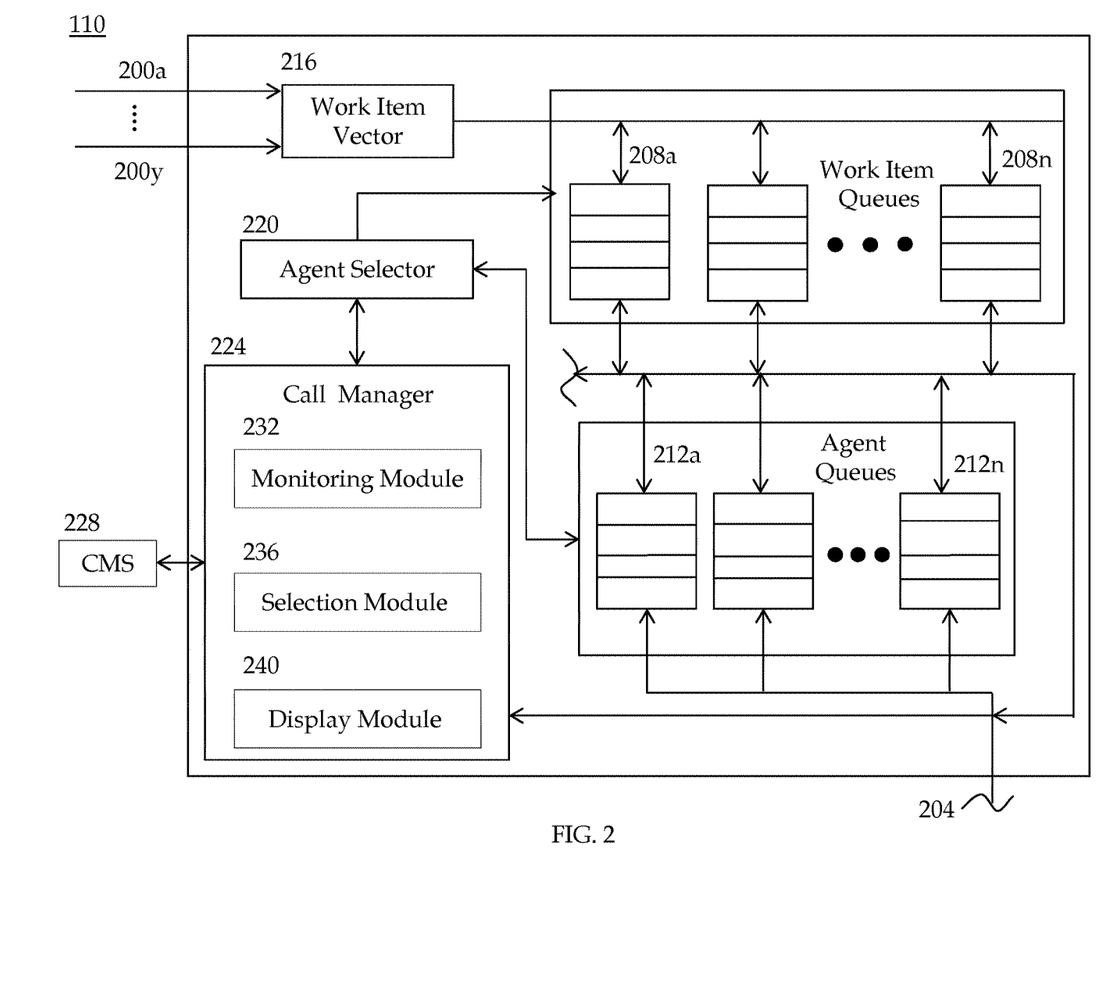
FIG. 2 illustrates a block diagram of a server according to an embodiment of the present invention.

Referring to FIG. 2, one possible configuration of the server 110 is depicted. The server 110 is in communication with a plurality of customer communication lines 200a-y (which can be one or more trunks, phone lines, etc.) and an agent communication line 204 (which can be a voice-and-data transmission line, such as the LAN 142 and/or a circuit switched voice line). The server 110 can include Avaya Inc.'s an Operational Analyst™ (OA) with On-Line Analytical Processing (OLAP) technology or a Call Management System (CMS) 228 that gathers contact records. OA and CMS will hereinafter be referred to jointly as CMS 228.

As shown in FIG. 2, among the data stored in the server 110 is a set of contact or work item queues 208a-n and a separate set of agent queues 212a-n. Each contact queue 208a-n corresponds to a different set of agent queues, as does each agent queue 212a-n. Conventionally, contacts are prioritized and either is enqueued in individual ones of the contact queues 208a-n in their order of priority or is enqueued in different ones of a plurality of contact queues that correspond to a different priority. Likewise, each agent's queues are prioritized according to his or her level of expertise or skill in that queue, and either agents are enqueued in individual ones of agent queues 212a-n in their order of expertise level or are enqueued in different ones of a plurality of agent queues 212a-n that correspond to a queue and each one of which corresponds to a different expertise level.

According to an embodiment of the present invention, included among the control programs in the server 110 is a work item vector 216. Contacts or calls incoming to the contact center are assigned by the work item vector 216 to different work item queues 208a-n based upon a number of predetermined criteria, including customer identity, customer needs, contact center needs, current contact center queue lengths, customer value, and the agent skill that is required for proper handling of the contact. Agents who are available for handling work items are assigned to agent queues 212a-n based upon the skills they possess. An agent may have multiple skills, and hence may be assigned to multiple agent queues 212a-n simultaneously. Furthermore, an agent may have different levels of skill expertise (e.g., skill levels 1-N in one configuration or merely primary skill levels and secondary skill levels in another configuration), and hence may be assigned to different agent queues 212a-n at different expertise levels.

Further, included among the programs executing on the server 110 are an agent selector 220 and a call manager 224. The agent selector 220 and the call manager 224 are stored either in the main memory or in a peripheral memory (e.g., disk, CD ROM, etc.) or some other computer-readable medium of the contact center. Further, the agent selector 220 monitors the occupants of the work item and queues 208a-n and 212a-n, respectively, and contact center objectives, rules, and policies and assigns agents to service work items.

The agent selector 220 distributes and connects these work items to communication devices of available agents based on the predetermined criteria noted above. When the agent selector 220 forwards a contact (or first work item) to an agent, the agent selector 220 also forwards customer-related information from the database 114 to the agent's desktop or computer work station for previewing and/or viewing (such as by a pop-up display) to permit the agent to better serve the customer. Depending on the contact center configuration, the agent selector 220 may reallocate the work items to the agents. The agents process the contacts or work items sent to them by the agent selector 220.

In an embodiment of the present invention, the agent and their associated data are maintained and updated by the database 114 of the contact center. Upon the completion of handling a work item, a generator (not shown) collects selected metrics for the work item. These metrics include the skill involved in servicing the work item, the identifier of the servicing agent, the contact duration, the transaction or contact type (e.g., sale, information request, complaint, etc.), the time-of-day, the result (e.g., the type of sale, the number of units sold, average revenue generated etc.), the rating of another party, such as the agent's supervisor or another observer, of how the work item was serviced, whether the agent requested assistance, and stores the information in the database 114, such as the CMS 228.

The call manager 224 has access to various details of customer service requests or calls as well as details of the agents handling the customer service requests. The call manager 224 may also monitor various attributes of agents and the customers while handling the customer service requests. In an embodiment of the present invention, the attributes may include, but is not restricted to, facial expressions, behavior, voice pitch, tone, sentiments, concentration, text, and so on. Further, the call manager 224 analyses the conversation between the agent and the customer and extracts some keywords or phrases.

These keywords or phrases may indicate the context of the conversation between the agent and the customer. Based on these keywords or phrases, the call manager 224 may select data items from a database to draw his attention to a particular keyword or a phrase during the conversation. In an embodiment of the present invention, the data items may include, but is not restricted to, a question, a graphical symbol, a predefined script, change in background, an instruction, a sound signal, and so on. Further, the call manager 224 may display the selected data items on the agent's desktop as a pop up display, or may play a sound such as alarm bell, trumpet sound, and so on.

The data items displayed on the agent's desktop is selected from the database 114 based on a psychological profile or rules. In an embodiment of the present invention, the psychological profile or rules may estimate duration or time required by an agent for handling a customer service request. For example, standard call duration of a sales call is 10 minutes and if an agent is taking on an average 5 minutes to handle a sales call, then it may be inferred the agent is not paying much attention while handling the customer service request. On the other hand, if an agent's average duration for a sales call is 15 minutes as compared to standard sales call duration of 10 minutes, then it may be deduced the agent is concentrating on the call and the agent is providing complete and appropriate information to the customer. In an embodiment of the present invention, the psychological profile or rules may include, but is not restricted to history of the agent, skill sets, a type of call, and so on.

According to an embodiment of the present invention, the call manager 224 includes a monitoring module 232, a selection module 236, and a display module 240.

The monitoring module 232 may monitor details about a conversation in an embodiment of the present invention. The monitoring module 232 may monitor a type of the conversation i.e., whether a call made by a caller (e.g., customer) is a video conversation, a voice conversation, a textual conversation, an email conversation, an instant messaging conversation, or a text conversation. Further, the monitoring module 232 may monitor static details about the incoming call, for example, inputs selected by the caller in an IVR menu of the contact center. For example, if a caller selects 'loan option' in an IVR menu and further selects 'car loan enquiry', then the monitoring module 232 may store 'loan' and 'car loan enquiry' as keywords of the call in the database 114 of the contact center. Further, the monitoring module 232 may monitor attributes of agents and attributes of the customer during the conversation. In an embodiment of the present invention, the attributes may include, but is not restricted to, facial expressions, extended silence by the agent, behavior, voice pitch, tone, sentiments, concentration, a text, and so on.

The monitoring module 232 is configured to monitor conversation between the agent and the customer during the conversation in another embodiment of the present invention. The monitoring module 232 may further extract keywords or phrases from the monitored conversation between the agent and the customer in an embodiment of the present invention. For example, the customer provides information that he is already repaying installments of two loans then "repaying two loans" may be extracted as keywords or phrases from the conversation.

In an embodiment of the present invention, if the type of call is a text conversation such as an instant messaging, or an email, then the monitoring module 232 may analyze the text and then extract keywords from the conversation. In another embodiment of the present invention, if the type of call is a voice conversation, then speech of the customer and the agent is converted into text by a voice recognition module (not shown) and is then analyzed. Based on the analysis, the monitoring module 232 extracts keywords or phrases from the text. Further, if the type of incoming call is a video conversation, then speech of the caller and the agent is converted into text by a voice recognition module (not shown) and is then analyzed to extract keywords or phrases from the conversation in yet another embodiment of the present invention. Further, video of the incoming call is analyzed to extract other information, about the customer and the agent, such as facial expressions, behavior, and so on. In an embodiment of the present invention, monitoring of the call is carried out in a real time environment.

The monitoring module 232 is configured to collect profile and data of agents of the contact center in an embodiment of the present invention, wherein the agent data for providing customer services is obtained by the contact center in several ways and from several sources. A primary source for collecting the agent data may be the contact center itself. However, information included in the agent data may provide a limited view of the overall characteristics of the agent, specifically the characteristics of the agent with respect to the contact center. The agent profile may include agent's self-description, skill sets, likes, locations etc. The agent's skill sets include agent's interests, education and work histories, hobbies, hometowns, favourite sport teams and TV shows, cultural background, and so on. In an embodiment of the present invention, the agent profile is stored and maintained in the database 114 of the contact center.

Further, the monitoring module 232 may find correlation between the extracted keywords or phrases in an embodiment of the present invention. For example, based on the extracted keywords "loan", "car loan enquiry", and "repaying two loans", the monitoring module 232 may correlate that the customer desires to inquire about a car loan policy but is already repaying installments of two loans.

The selection module 236 may select data items from the database 114 of the contact center in an embodiment of the present invention. The selection module 236 may select the data items based on the psychological rules and profiles. In an embodiment of the present invention, the psychological rules and profiles may include, but is not restricted to, history of the agents, skill sets, type of call, and so on. In an embodiment of the present invention, the selection module 236 may select one of the psychological profile and rules that may perform the best to draw the agent's attention and to increase the agent's concentration during the conversation.

Further, the data items may include, a random question, which is selected based on the keywords or phrases extracted from the conversation. The selected question may disturb the agent's thinking pattern and force him to re-focus or re-think on some important keyword of the conversation. For example, in a textual conversation, the customer is inquiring about a car loan policy and is already repaying two loans, then the selection module 236 may select a question "Do you think you would be able to repay all these loans with 'XX' salary?". This question may force the agent, handling the conversation, to re-think about the customer's situation before taking any decision.

In another embodiment of the present invention, the selection module 236 may select graphical symbols that may be displayed on the agent's desktop to draw his attention to a specific keyword or phrase. In yet another embodiment of the present invention, the selection module 236 may change the background display of the agent's desktop. The selection module 236 may select a predefined script from the database 114 of the contact center in an embodiment of the present invention.

For voice based conversations, the selection module 236 may select an audio signal to interrupt the agent and to draw his attention to a specific keyword or phrase in an embodiment of the present invention. The audio signal may include, but is not restricted to, a short tune, an alarm bell, a trumpet sound, and so on. Also, the selection module 236 may select a question from the database 114 of the contact center that may be synthesized with the speech of the agent in another embodiment of the present invention. Synthesized speech may have different voices/accents to vary the distraction effects on the agent's concentration. In another embodiment of the present invention, different type of signals may indicate different types of actions such as notifications, congratulations, danger, and so on.

The display module 240 may display the data items on the agent's terminal in an embodiment of the present invention. For textual conversations, the display module 240 may display a plurality of alerts comprising a beep, a flash, a prompt, a chat, and a popup on the agent's desktop. The alert may notify the agent to focus on the keywords or phrases and to take appropriate actions. In another embodiment of the present invention, for voice conversations, the display module 240 may play the sound signal on the agent's terminal to draw his attention to a particular keyword.

Figure 3:
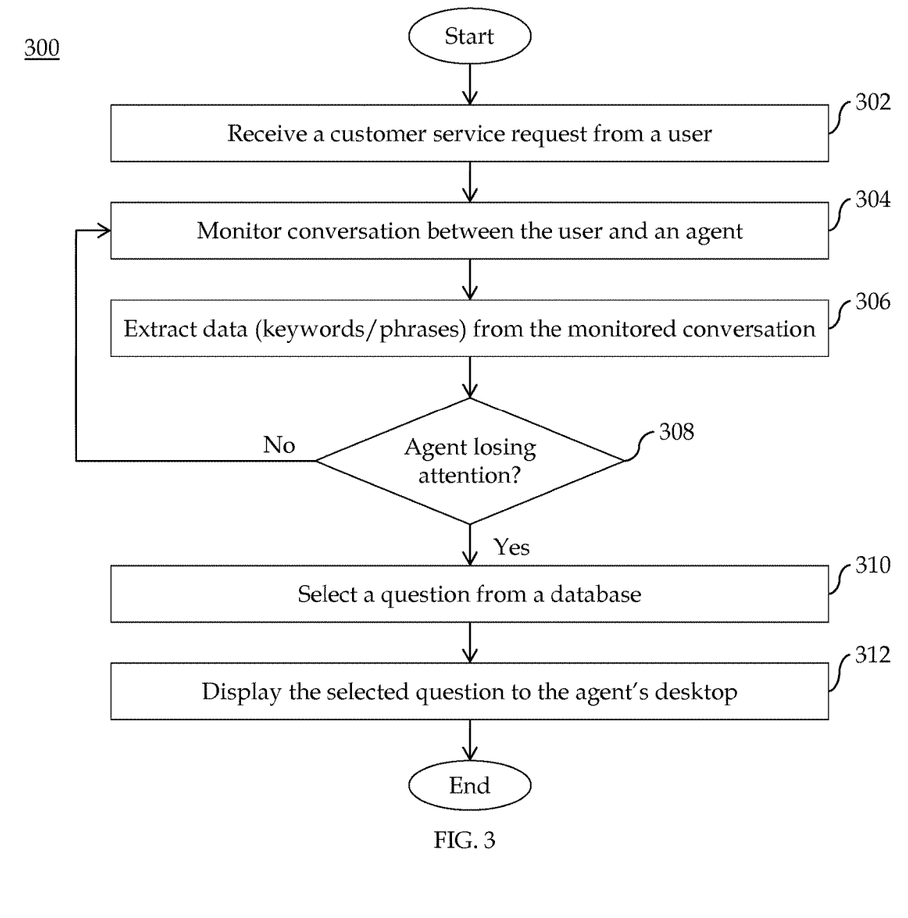
FIG. 3 depicts a flowchart of a method for providing agent assistance according to an embodiment of the present invention.

FIG. 3 depicts a flowchart of a method for providing agent assistance in a contact center according to an embodiment of the present invention.

At step 302, a call manager 224 receives a customer service request or call from a user (or customer). In an embodiment of the present invention, type of received call may include a voice conversation e.g., through a telephone call, or a video conversation. The type of call may include an email, an instant messaging, and a text message in another embodiment of the present invention. For example, the call manager 224 receives a voice call from a user.

At step 304, the call manager 224 monitors customer inputs and conversations between the customer and an agent handling the call. In an embodiment of the present invention, for a voice conversation, speech of the customer and the agent is converted into text for monitoring the conversation. Further, the call manager 224 monitors attributes of the agents during the voice call. In an embodiment of the present invention, the attributes may include, but is not restricted to, facial expressions, behavior, voice pitch, tone, concentration, sentiments, text, and so on.

At step 306, the call manager 224 extracts data such as keywords or phrases from the text of the monitored conversations. For example, a customer selects "loan" and "car loan policy" from an IVR menu of a contact center and during the conversation, the customer provides information to the agent that the customer is "repaying two loans", then the call manager 224 extracts keywords such as "loan", "car loan enquiry", "repaying two loans", and so on from the conversation between the agent and the customer.

At step 308, the call manager determines 224 whether the agent is losing attention or not. The call manager 224 determines the agent's attention based on the monitored attributes. For example, if the call manager 224 determines positive sentiments of the agent (i.e. agent greets the customer) then the agent is paying full attention on the call and the method returns to the step 304. Otherwise the method proceeds towards step 310.

At step 310, the call manager 224 selects a question from a database of the contact center. In an embodiment of the present invention, the call manager 224 may randomly selects the question from the database of the contact center. The call manager 224 selects the question from a predefined script or template of the contact center in another embodiment of the present invention. Further, the question selected by the call manager 224 may be related to the extracted keywords or phrases from the conversation. For example, in this case, the call manager 224 selects a question "do you think you would be able to repay a third loan when you are already repaying installments of other two loans with 'XX' salary?".

At step 312, the call manager 224 displays the selected question on the agent's desktop. In an embodiment of the present invention, the call manager 224 generates an alert or notification on the agent's desktop such as a beep, a flash, a prompt, a chat, or a popup on the agent's desktop. Further, the alert displayed on the agent's desktop interrupts the agent and forces him to re-think about the customer's condition. Further, the displayed alerts may refresh the agent's attention for rest of the voice call.

Figure 4:
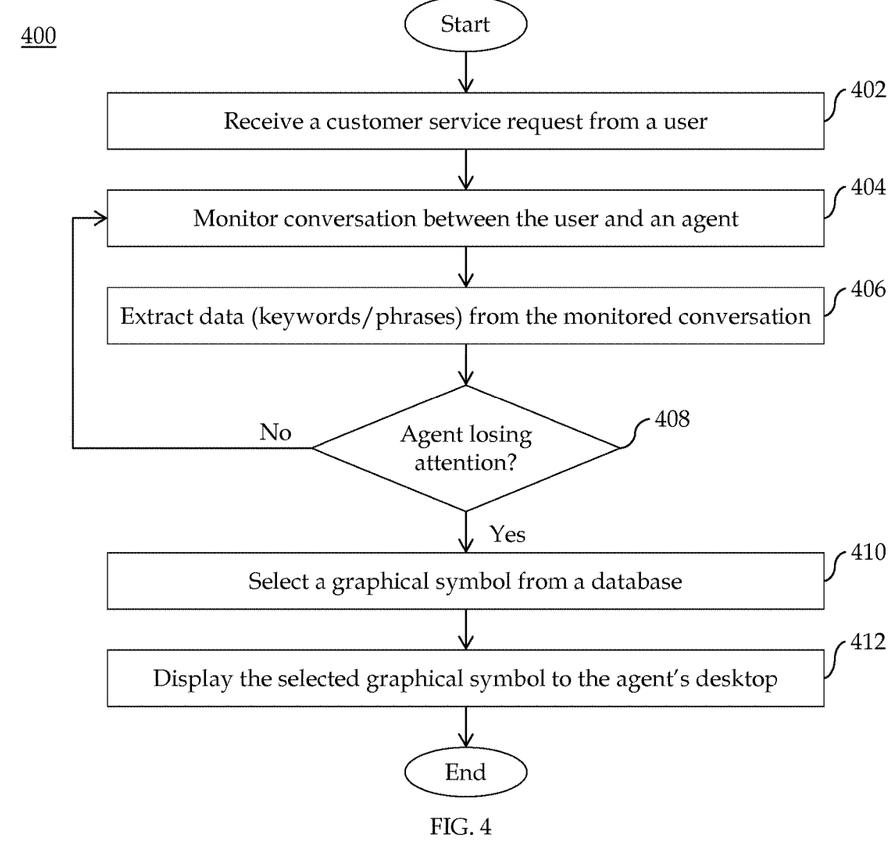
FIG. 4 depicts a flowchart of a method for providing agent assistance according to another embodiment of the present invention.

FIG. 4 depicts a flowchart of a method for providing agent assistance in a contact center according to another embodiment of the present invention.

At step 402, a call manager 224 receives a customer service request or call from a customer. In an embodiment of the present invention, type of conversation of the call, and may include a voice conversation e.g., a telephone call, or a video conversation. The type of conversation may further include an email conversation, an instant messaging conversation, and a text message conversation in another embodiment of the present invention. For example, the call manager 224 receives an instant message from a customer.

At step 404, the call manager 224 monitors conversations between the customer and an agent handling the customer service request (i.e. instant message conversation). For example, the customer may message the agent to inquire about a "home loan", and based on these messages, an agent is providing information about the "home loan" to the customer. Further, during their conversation, the customer provides information to the agent that the customer is "already repaying two loans". The call manager 224 monitors attributes of the agents and the customer from the textual conversation with the customer. In an embodiment of the present invention, the attributes may include, but is not restricted to, a text, time of response to a query, greetings to the customer, providing correct and adequate information, and so on.

At step 406, the call manager 224 extracts data such as keywords or phrases from the text of the monitored conversations. For example, from the text of the conversation, the call manager 224 extracts keywords or phrases such as "home loan", "repaying two loans", and so on.

At step 408, the call manager determines 224 whether the agent is losing attention or not. The call manager 224 determines the agent's attention based on the monitored attributes of the agent and the customer. For example, if the call manager 224 determines positive sentiments of the customer (i.e. customer is happy and satisfied with the agent's response) then the agent is focusing on the call and the method returns to the step 404. Otherwise the method proceeds towards step 410.

At step 410, the call manager 224 selects a graphical symbol (e.g., for danger, congratulation, notification, and so on) from a database of the contact center. In an embodiment of the present invention, the call manager 224 randomly selects the graphical symbol from the database of the contact center. The call manager 224 selects the graphical symbol based on the monitored conversation between the agent and the customer in another embodiment of the present invention. Further, the graphical symbol selected by the call manager 224 may be associated with the context of the conversation for providing information related to the customer's query. For example, in this case, the call manager 224 selects a graphical symbol that represents "danger" as the customer is already repaying installments of two loans and now inquiring about "home loan".

At step 412, the call manager 224 displays the selected graphical symbol on the agent's desktop. In an embodiment of the present invention, the call manager 224 generates an alert or notification on the agent's desktop such as a beep, a flash, a prompt, a chat on a new window, or a popup on the agent's desktop. Further, the alert displayed on the agent's desktop interrupts the agent and forces him to re-scan the textual conversation. Further, the displayed alert may refresh the agent's attention for rest of the conversation.

The exemplary systems and methods of this present invention have been described in relation to a contact center. However, to avoid unnecessarily obscuring the present invention, the preceding description omits a number of known structures and devices. This omission is not to be construed as a limitation of the scope of the present invention. Specific details are set forth to provide an understanding of the present invention. It should however be appreciated that the present invention may be practiced in a variety of ways beyond the specific detail set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the present invention.

A number of variations and modifications of the present invention can be used. It would be possible to provide for some features of the present invention without providing others.

For example in one alternative embodiment of the present invention, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A call manager for providing agent assistance in a contact center, comprising:
 a memory storing executable code; and
 a processor in communication with the memory, the processor when executing the executable code:
  monitors at least one conversation between a customer and an agent;
  monitors one or more attributes of the agent, wherein the one or more monitored attributes comprise at least a concentration of the agent;
  extracts one or more keywords from the at least one monitored conversation;
  determines one or more data items for the agent based on the one or more monitored attributes of the agent and the one or more extracted keywords;
  selects one or more of the one or more determined data items, wherein at least one of a psychological profile or a plurality of psychological rules associated with the agent is used to select the one or more determined data items to increase the agent's concentration; and
  drives a display of the one or more selected data items to the agent to improve handling of the at least one conversation.

2. The call manager of claim 1, wherein the conversation comprises at least one of a voice conversation, a video conversation, an email conversation, an instant messaging conversation, or a text message conversation.

3. The call manager of claim 1, wherein the processor when executing the executable code:
 monitors the at least one conversation between a customer and an agent in real time.

4. The call manager of claim 1, wherein the processor when executing the executable code:
 collects a profile of the agent handling the at least one conversation.

5. The call manager of claim 4, wherein the agent profile comprises at least one of a self-description, likes, locations, education and work histories, interests, or cultural background.

6. The call manager of claim 1, wherein the one or more monitored attributes of the agent comprise at least one of a facial expression, behavior, voice pitch, tone, sentiments, or text.

7. The call manager of claim 1, wherein the one or more data items comprise at least one of a random question, a graphical symbol, a predefined script, an instruction, or a sound signal.

8. The call manager of claim 7, wherein the processor when executing the executable code:
 determines a correlation between two or more of the extracted keywords,
 wherein at least one of the one or more selected data items comprises a question selected based on the correlation.

9. The call manager of claim 1, wherein one or more of the psychological profile and the psychological rules comprise at least one of a history of the agent, skill sets, or a type of the at least one conversation.

10. The call manager of claim 1, wherein the processor when executing the executable code:
 generates one or more alerts and notifications based on the one or more selected data items.

11. The call manager of claim 10, wherein the one or more alerts comprise at least one of a beep, a flash, a prompt, a chat, or a popup.

12. The call manager of claim 1, wherein the processor when executing the executable code:
 controls playing of at least one selected sound signal.

13. A computer-implemented method for providing agent assistance in a contact center, the method comprising:
 monitoring, by a server of a contact center, at least one conversation between a customer and an agent;
 monitoring, by the server of the contact center, one or more attributes of the agent, wherein the one or more monitored attributes comprise at least a concentration of the agent;
 extracting, by the server of the contact center, one or more keywords from the at least one monitored conversation;

determining, by the server of the contact center, one or more data items for the agent based on the one more monitored attributes of the agent and the one or more extracted keywords;

selecting, by the server of the contact center, one or more of the one or more determined data items, wherein at least one of a psychological profile or a plurality of psychological rules associated with the agent are used to select one or more determined data items to increase the agent's concentration; and driving, by the server of the contact center, a display of the one or more selected data items to the agent to improve handling of the at least one conversation.

14. The method of claim 13, wherein the conversation comprises at least one of a voice conversation, a video conversation, an email conversation, an instant messaging conversation, or a text message conversation.

15. The method of claim 13, wherein the one or more monitored attributes of the agent comprise at least one of a facial expression, behavior, voice pitch, tone, sentiments, or text.

16. The method of claim 13, wherein the one or more data items comprise at least one of a random question, a graphical symbol, a predefined script, an instruction, or a sound signal.

17. The method of claim 13, wherein one or more of the psychological profile and the psychological rules comprise at least one or more of a history of an agent, skill sets, or a type of the at least one conversation.

* * * * *

UNITED STATES PATENT AND TRADEMARK OFFICE
CERTIFICATE OF CORRECTION

PATENT NO.         : 10,079,937 B2                                              Page 1 of 1
APPLICATION NO.    : 14/287378
DATED              : September 18, 2018
INVENTOR(S)        : Dawid Nowak et al.

It is certified that error appears in the above-identified patent and that said Letters Patent is hereby corrected as shown below:

In the Claims

Claim 17, Line 27, "at least one or more of a history of an agent, skill sets, or a" should read --one or more of a history of an agent, skill sets, or a--

Signed and Sealed this
Twenty-sixth Day of February, 2019

Andrei Iancu
*Director of the United States Patent and Trademark Office*